(12) United States Patent
Momose et al.

(10) Patent No.: US 10,052,553 B2
(45) Date of Patent: Aug. 21, 2018

(54) INFORMATION PROCESSING APPARATUS, INFORMATION PROCESSING SYSTEM, INFORMATION PROCESSING METHOD, AND RECORDING MEDIUM

(71) Applicants: Hiroshi Momose, Kyoto (JP); Kaori Ando, Kyoto (JP); Hideaki Araki, Kyoto (JP); Takayuki Ito, Tokyo (JP); Nayuta Taga, Tokyo (JP); Yoshihiro Hatta, Tokyo (JP)

(72) Inventors: Hiroshi Momose, Kyoto (JP); Kaori Ando, Kyoto (JP); Hideaki Araki, Kyoto (JP); Takayuki Ito, Tokyo (JP); Nayuta Taga, Tokyo (JP); Yoshihiro Hatta, Tokyo (JP)

(73) Assignees: NINTENDO CO., LTD., Kyoto (JP); AMBRELLA CO., LTD., Tokyo (JP); THE POKÉMON COMPANY, Tokyo (JP)

( * ) Notice: Subject to any disclaimer, the term of this patent is extended or adjusted under 35 U.S.C. 154(b) by 26 days.

(21) Appl. No.: 14/261,066

(22) Filed: Apr. 24, 2014

(65) Prior Publication Data

US 2015/0031461 A1    Jan. 29, 2015

(30) Foreign Application Priority Data

Jul. 25, 2013  (JP) ................................ 2013-154945

(51) Int. Cl.
*A63F 13/60* (2014.01)
*A63F 13/327* (2014.01)
(Continued)

(52) U.S. Cl.
CPC .......... *A63F 13/327* (2014.09); *A63F 13/825* (2014.09); *A63F 13/95* (2014.09); *A63F 13/73* (2014.09)

(58) Field of Classification Search
CPC .............................. A63F 13/327; A63F 13/95
See application file for complete search history.

(56) References Cited

U.S. PATENT DOCUMENTS 7,062,073 B1 *  6/2006  Tumey ..................... A63H 3/28
                                                          382/118
7,827,440 B1 * 11/2010  Dudte ................. G06F 11/0742
                                                          714/42

(Continued)

FOREIGN PATENT DOCUMENTS

JP        8-044832        2/1996
JP       11-149531        6/1999
(Continued)

OTHER PUBLICATIONS

WiiU Software for "Pokemon Scrumble U"—available for download from the following Nintendo Web site, http://www.nintendo.co.jp/wiiu/wcnj/index.html, Apr. 24, 2013, printed on Apr. 21, 2014, 1 page.

*Primary Examiner* — James S McClellan
*Assistant Examiner* — Kevin Carter
(74) *Attorney, Agent, or Firm* — Nixon & Vanderhye, P.C.

(57) ABSTRACT

An example system includes: a contactless communication part that performs contactless communication with a data storage medium having a contactless communication function; a data writing part that writes data to the data storage medium by the contactless communication part; a storage part that stores the data written by the data writing part; and a corruption determination part that determines whether the data stored in the data storage medium is corrupted or not. When the corruption determination part determines that the data is corrupted, the data writing part writes the data stored in the storage part, to the data storage medium.

12 Claims, 12 Drawing Sheets

(51) Int. Cl.
*A63F 13/825* (2014.01)
*A63F 13/95* (2014.01)
*A63F 13/73* (2014.01)

(56) References Cited

U.S. PATENT DOCUMENTS

| | | | | |
|---|---|---|---|---|
| 2002/0042892 A1* | 4/2002 | Gold | G06F 11/1417 | 714/6.11 |
| 2004/0092255 A1* | 5/2004 | Ji | G06F 8/68 | 455/419 |
| 2004/0214642 A1* | 10/2004 | Beck | A63F 13/327 | 463/40 |
| 2006/0128463 A1* | 6/2006 | Okada | G07F 17/32 | 463/29 |
| 2006/0178201 A1* | 8/2006 | Okada | G07F 17/32 | 463/20 |
| 2006/0223496 A1* | 10/2006 | Benco | G06F 21/57 | 455/410 |
| 2007/0202940 A1* | 8/2007 | Okada | G07F 17/32 | 463/25 |
| 2008/0022160 A1* | 1/2008 | Chakraborty | G06F 21/56 | 714/100 |
| 2008/0168243 A1* | 7/2008 | Bychkov | G06F 11/1443 | 711/161 |
| 2008/0318658 A1* | 12/2008 | Sylla | G07F 17/32 | 463/20 |
| 2009/0124165 A1* | 5/2009 | Weston | A63H 3/00 | 446/268 |
| 2010/0214075 A1* | 8/2010 | Chae | G06F 11/1482 | 340/10.4 |
| 2010/0332916 A1 | 12/2010 | Fukuda et al. | | |
| 2011/0077086 A1* | 3/2011 | Grube | A63F 13/12 | 463/42 |
| 2011/0153571 A1* | 6/2011 | Walker | G06F 11/1435 | 707/654 |
| 2012/0144383 A1* | 6/2012 | Mishra | G06F 11/36 | 717/173 |
| 2012/0190452 A1* | 7/2012 | Weston | A63F 13/24 | 463/39 |
| 2013/0201316 A1* | 8/2013 | Binder | H04L 67/12 | 348/77 |
| 2015/0363130 A1 | 12/2015 | Nakano | | |

FOREIGN PATENT DOCUMENTS

| | | |
|---|---|---|
| JP | 2003-308501 | 10/2003 |
| JP | 2005-270169 | 10/2005 |
| JP | 2006-105808 | 4/2006 |
| JP | 2006-231775 | 9/2006 |
| JP | 2008-231775 | 2/2008 |
| JP | 2008-250426 | 10/2008 |
| JP | 2009-233238 | 10/2009 |
| JP | 2010-233791 | 10/2010 |
| JP | 2011-13831 | 1/2011 |
| JP | 2014-146160 | 8/2014 |

* cited by examiner

FIG.4

CHARACTER DATA OF FIGURE

| GAME APPARATUS ID | CHARACTER CAPABILITY VALUE | UPDATE DATE AND TIME |
|---|---|---|
| GAME APPARATUS A | ATTACK=3、SPEED=8、… | 20130707, 17:32 |
| GAME APPARATUS B | ATTACK=2、SPEED=5、… | 20130630, 20:14 |
| GAME APPARATUS C | ATTACK=3、SPEED=5、… | 20130704, 18:01 |
| … … | … … | … … |

FIG.5

CHARACTER DATA OF GAME APPARATUS

| FIGURE ID | CHARACTER CAPABILITY VALUE | UPDATE DATE AND TIME |
|---|---|---|
| FIGURE a | ATTACK=5、SPEED=8、… | 20130708, 16:55 |
| FIGURE b | ATTACK=7、SPEED=2、… | 20130702, 17:01 |
| FIGURE c | ATTACK=5、SPEED=4、… | 20130705, 18:18 |
| … | … | … |

INFORMATION PROCESSING APPARATUS, INFORMATION PROCESSING SYSTEM, INFORMATION PROCESSING METHOD, AND RECORDING MEDIUM

CROSS-REFERENCE TO RELATED APPLICATIONS

This application is based upon and claims the benefit of priority of the prior Japanese Patent Application No. 2013-154945, filed on Jul. 25, 2013, the entire contents of which are incorporated herein by reference.

FIELD

The technology herein relates to an information processing apparatus, an information processing system, an information processing method and a recording medium where contactless communication is performed with a data storage medium and information processing according to the data stored in the data storage medium is performed.

BACKGROUND AND SUMMARY

Conventionally, contactless communication technologies have been widespread such as NFC (near field communication) and RFID (radio frequency identification) where radio communication is performed with an IC (integrated circuit) tag or the like in a contactless manner. Recent information processing apparatuses such as game apparatuses and mobile telephones are beginning to use these contactless communication technologies. For example, a game apparatus or a game program is available where contactless communication is performed with a data storage medium such as a card incorporating an IC tag and the data obtained from the data storage medium is reflected in the contents of the game.

According to an aspect of the embodiment, an information processing apparatus includes: a contactless communication part that performs contactless communication with a data storage medium having a contactless communication function; a data writing part that writes data to the data storage medium by the contactless communication part; a storage part that stores the data written by the data writing part; and a corruption determination part that determines whether the data stored in the data storage medium is corrupted or not, and when the corruption determination part determines that the data is corrupted, the data writing part writes the data stored in the storage part, to the data storage medium.

The object and advantages of the invention will be realized and attained by means of the elements and combinations particularly pointed out in the claims.

It is to be understood that both the foregoing general description and the following detailed description are exemplary and explanatory and are not restrictive of the invention.

These and other objects, features, aspects and advantages of the technology herein will become more apparent from the following detailed description when taken in conjunction with the accompanying drawings.

BRIEF DESCRIPTION OF THE DRAWINGS

FIG. 4 shows an example non-limiting schematic view showing an example of character data of the figure;

FIG. 5 shows an example non-limiting schematic view showing an example of character data of the game apparatus;

DETAILED DESCRIPTION OF NON-LIMITING EXAMPLE EMBODIMENTS

<System Summary>

Figure 1:
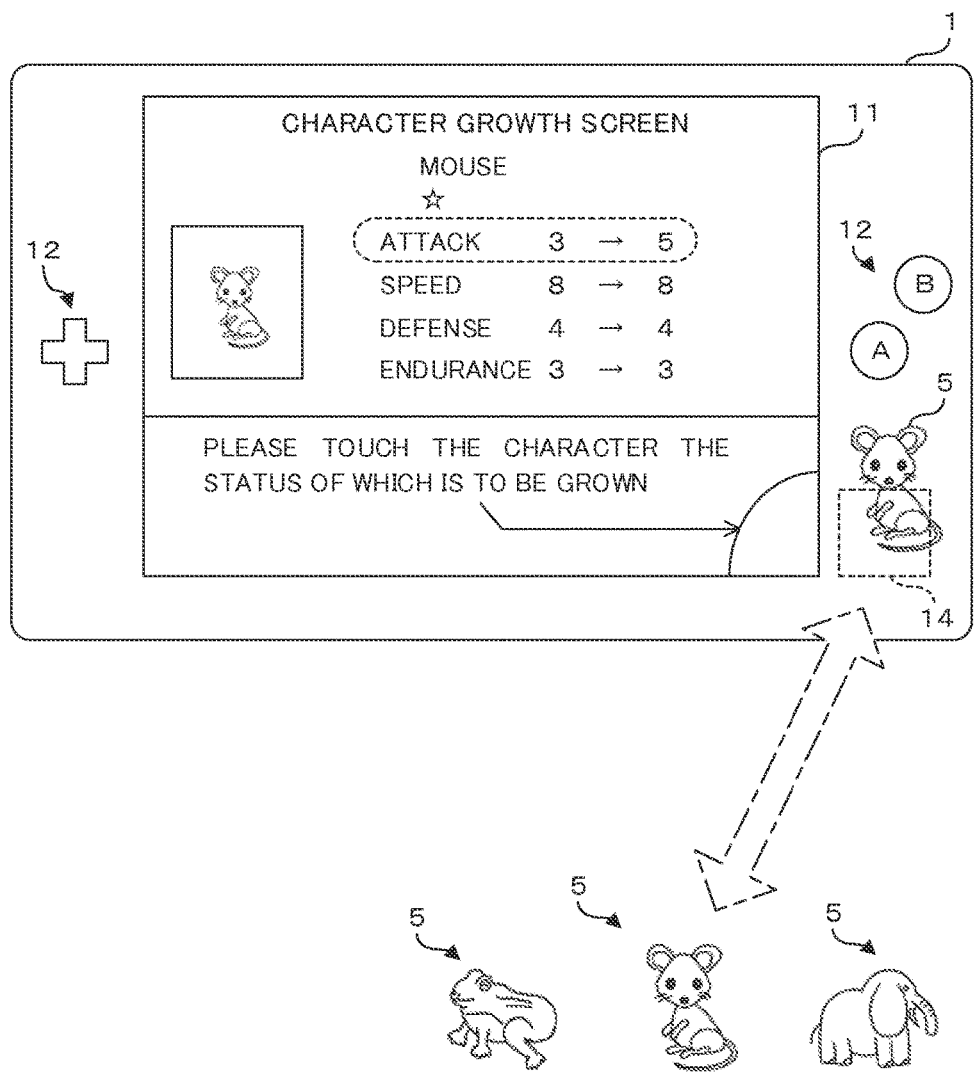
FIG. 1 shows an example non-limiting schematic view for explaining the summary of an information processing system according to the present example embodiment.

FIG. 1 shows an example non-limiting schematic view for explaining the summary of an information processing system according to the present example embodiment. The information processing system according to the present example embodiment includes a portable game apparatus 1 that the user can carry around and one or more than one FIG. 5 used for a game. The game apparatus 1 has a structure in which a display 11, an operation part 12 and the like are provided on one surface of a flat substantially cuboidal housing. The game apparatus 1 according to the present example embodiment has, inside the housing, a contactless communication part 14 that performs contactless communication with the FIG. 5.

The FIG. 5 is a data storage medium used by the user in a specific game implemented by executing a game program according to the present example embodiment on the game apparatus 1. In the game according to the present example embodiment, a plurality of characters are prepared as player objects operated by the user. The FIG. 5 has a configuration resembling the appearance of a character appearing in the game. The FIG. 5 is formed of a synthetic resin or the like. In the game according to the present example embodiment, the user plays the game by using at least one FIG. 5. The user can add an appropriate FIG. 5 according to his/her taste and use more than one FIG. 5 for the game. In this example, the user plays the game by using three FIG. 5 corresponding to a frog, mouse and elephant characters.

The FIG. 5 is embedded with an IC tag or the like, and is capable of performing contactless communication with the game apparatus 1. The FIG. 5 has a storage part which stores various pieces of data according to its character. The game apparatus 1 is capable of reading data from the FIG. 5 by contactless communication. The game apparatus 1 is capable of performing updating of the data stored in the FIG. 5, addition of data or the like.

In the present example embodiment, capability values such as the attack power, the speed, the defense power and the endurance power are set for each character of the game. The FIG. 5 is capable of storing the capability values of the corresponding character. The user appropriately selects the FIG. 5 used for the game, for example, at the time of start of the game. The user loads data such as the capability values of the character stored in the selected FIG. 5 onto the game apparatus 1. At this time, the user can load the data in the FIG. 5 onto the game apparatus 1 by bringing the selected FIG. 5 into contact with a predetermined area of the game apparatus 1. In FIG. 1, the predetermined area of the game apparatus 1 is the area shown by the broken square and the periphery thereof. The FIG. 5 does not necessarily have to be brought into contact with the game apparatus 1 but only has to be brought close to the predetermined area of the game apparatus 1. The game apparatus 1 reads data from the FIG. 5 by contactless communication and reflects it in the capability values of the character of the game.

The user can increase the capability values of the character based on the scores, the experience value or the like obtained through playing of the game. In the illustrated example, the attack power of the mouse character is increased from 3 to 5. When a capability value of a character is increased, the user can write the increased capability value to the FIG. 5 corresponding to the character. At this time, the user can write the data to the FIG. 5 by bringing the FIG. 5 into contact with the predetermined area of the game apparatus 1. The game apparatus 1 transmits the increased capability value of the character to the FIG. 5 by contactless communication, and writes it. In the illustrated example, the FIG. 5 of a mouse is brought into contact with the game apparatus 1, thereby writing the capability values of the mouse character to the FIG. 5. At this time, even if the FIG. 5 of a frog or an elephant is brought into contact with the game apparatus 1, the capability values of the mouse character are not written to the FIG. 5.

In the game according to the present example embodiment, the user grows the character through playing of the game. The user stores the capability values increased by the growth into the FIG. 5 corresponding to the character. By doing this, even when playing the present game with a different game apparatus 1, the user can load the data in this FIG. 5 onto the game apparatus 1 if he/she carries the FIG. 5 with him/her. This enables the user to enjoy the game by using the grown character. Even when playing the game with a different game apparatus 1, the user can grow the character and write the capability values to the FIG. 5. The different game apparatus 1 is, for example, a game apparatus 1 possessed by a friend.

When the game apparatus 1 writes data to the FIG. 5 by contactless communication, there are cases where the contactless communication between the game apparatus 1 and the FIG. 5 becomes impossible to cause data writing to be interrupted or aborted abnormally. An example thereof is a case where the FIG. 5 is moved away from the game apparatus 1 before the data writing is completed. In such a case, the data stored in the FIG. 5 becomes not normal data that can be used for the game but abnormal data that cannot be used for the game. In the present example embodiment, such a situation will be referred to as that the data in the FIG. 5 is corrupted, and this data will be referred to as corrupted data.

In the information processing system according to the present example embodiment, when the data in the FIG. 5 is corrupted, processing where the game apparatus 1 restores this data is performed. To do this, the game apparatus 1 accumulates and stores the data written to the FIG. 5. The game apparatus 1 determines whether the data is corrupted or not when reading data from the FIG. 5. When the data is corrupted, the game apparatus 1 reads the data stored in itself, and writes it to the FIG. 5 to restore the data in the FIG. 5.

<System Configuration>

Figure 2:
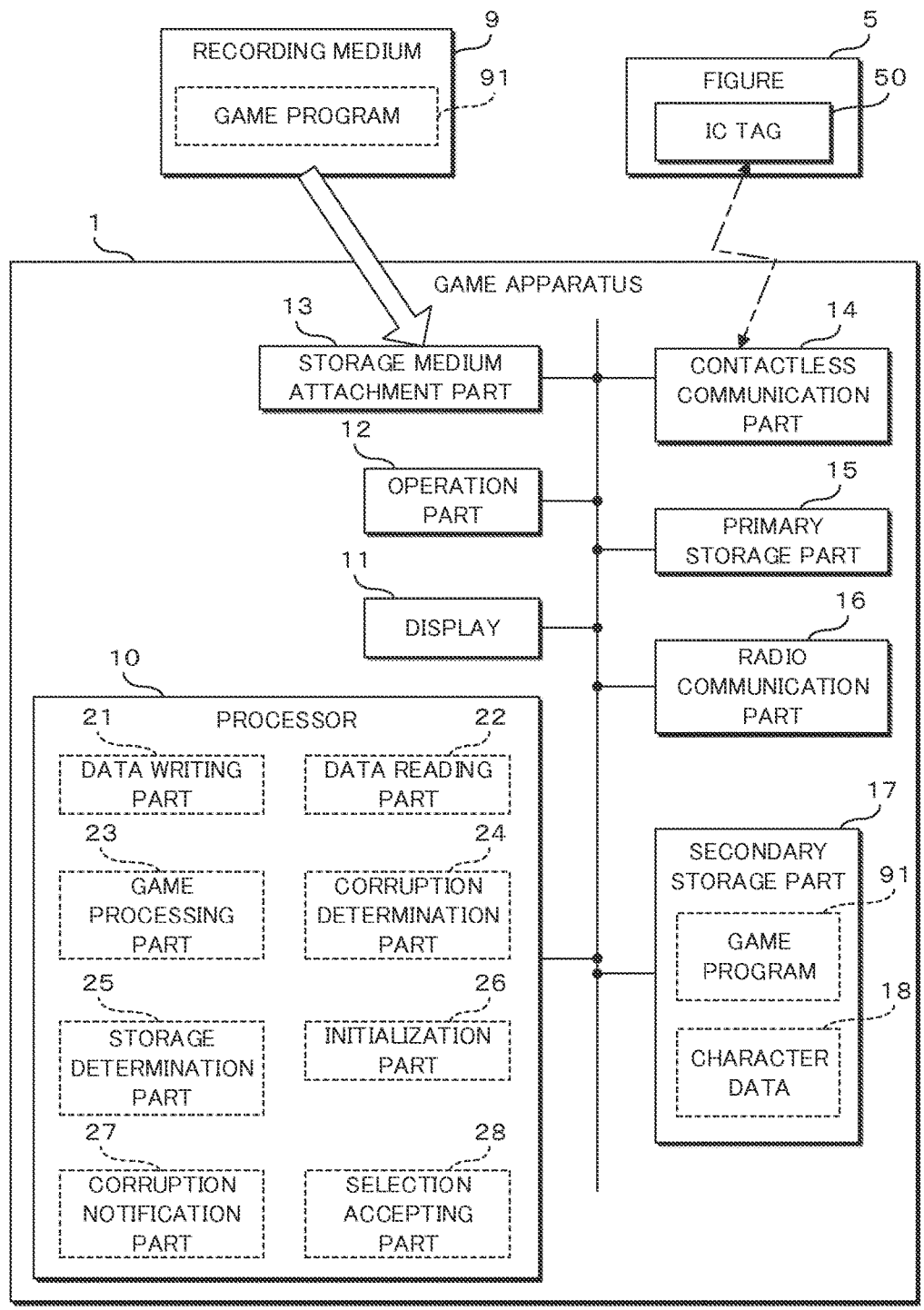
FIG. 2 shows an example non-limiting block diagram showing the structure of a game apparatus.

FIG. 2 shows an example non-limiting block diagram showing the structure of the game apparatus 1. The game apparatus 1 according to the present example embodiment includes a processor 10, the display 11, the operation part 12, a storage medium attachment part 13, the contactless communication part (contactless communication circuit) 14, a primary storage part 15, a radio communication part 16, and a secondary storage part 17. The processor 10 of the game apparatus 1 is structured by using an arithmetic processing unit such as a CPU (central processing unit). The processor 10 reads out, to the primary storage part 15, a game program 91 stored in the secondary storage part 17 or a game program 91 recorded on a recording medium 9 attached to the storage medium attachment part 13, and executes it. By doing this, the processor 10 performs various kinds of information processing related to the game. For example, the processor 10 performs the processing of accepting an operation performed on the operation part 12. For example, the processor 10 performs processing such as a determination of the game according to the accepted operation. For example, the processor 10 performs the processing of generating a game image displayed on the display 11 according to the accepted operation, an event in the game, or the like.

The display 11 is structured by using a liquid crystal panel or the like, and displays the image supplied from the processor 10. The operation part 12 is, for example, a push button or a touch panel provided on the display 11. The operation part 12 notifies the processor 10 of the contents of the operation performed by the user. The contents of the operation are, for example, a depression or a release of a button. The storage medium attachment part 13 is structured so that the recording medium 9 of a card type, a cassette type, a disc type or the like is detachably attachable thereto. The processor 10 is capable of reading the game program 91 and various pieces of data from the recording medium 9 attached to the storage medium attachment part 13.

The contactless communication part 14 performs contactless data transmission and reception by radio with the FIG. 5 or the like according to a communication standard such as ISO/IEC 18092 (so-called NFC). The communication distance of the contactless communication part 14 is approximately several centimeters to several meters. The contactless communication part 14 transmits a signal providing an instruction to read stored data, to an IC tag 50 embedded in the FIG. 5. The contactless communication part 14 receives desired data from the IC tag 50 of the FIG. 5 as a response to the reading instruction. The contactless communication part 14 has a so-called IC tag reader function. The contactless communication part 14 can make the IC tag 50 write data by transmitting a signal providing a writing instruction together with write data. That is, the contactless communication part 14 has an IC tag writer function. Here, the communication method of the contactless communication part 14 is not limited to NFC. The communication method of the contactless communication part 14 may be various communication methods, such as RFID, adopted as contactless communication, near field communication or the like.

The primary storage part 15 is structured by using a semiconductor memory element or the like. The primary storage part 15 temporarily stores various pieces of data generated in connection with the arithmetic processing by the processor 10. The radio communication part 16 performs data transmission and reception with a server apparatus or a different game apparatus 1 via a network such as a mobile telephone network or a wireless LAN (local area network). For example, the game apparatus 1 is capable of performing communication with a server apparatus by the radio communication part 16, downloading the game program 91 or the like and storing it into the secondary storage part 17.

The secondary storage part 17 is structured by using a non-volatile storage device having a large capacity compared with the primary storage part 15. The secondary storage part 17 stores the game program 91, character data 18 and the like. The character data 18 is data related to the capability values of the game character, and is backup data of the data written in the FIG. 5.

In the game apparatus 1 according to the present example embodiment, a data writing part 21, a data reading part 22, a game processing part 23, a corruption determination part 24, a storage determination part 25, an initialization part 26, a corruption notification part 27, a selection accepting part 28 and the like are implemented as software functional blocks in the processor 10 by the processor 10 executing the game program 91. The data writing part 21 performs the processing of writing data to the FIG. 5 by contactless communication. The data reading part 22 performs the processing of reading data from the FIG. 5 by contactless communication. The game processing part 23 performs various kinds of determination processing, event processing or the like related to the game. The corruption determination part 24 determines whether the data stored in the FIG. 5 is corrupted or not. The storage determination part 25 determines whether the backup data of the data stored in the FIG. 5 is stored in the secondary storage part 17 as the character data 18 or not. The initialization part 26 performs the processing of initializing the data in the FIG. 5. The corruption notification part 27 performs, when the data stored in the FIG. 5 is corrupted, the processing of notifying the user of this. The selection accepting part 28 performs, when the data stored in the FIG. 5 is corrupted, the processing of accepting a selection of whether to perform data restoration or data initialization based on the character data 18 in the secondary storage part 17 or not.

Figure 3:
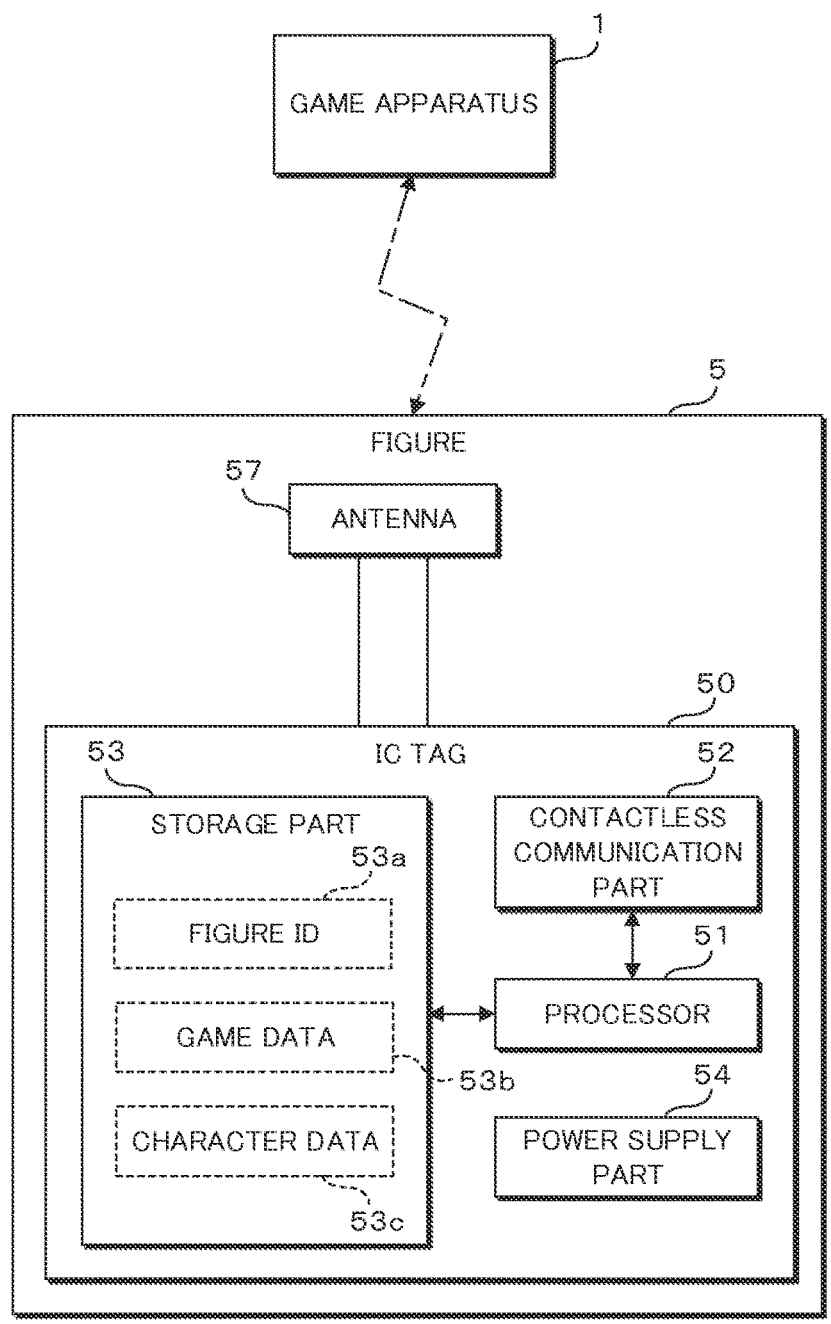
FIG. 3 shows an example non-limiting block diagram showing the structure of a figure.

FIG. 3 shows an example non-limiting block diagram showing the structure of the FIG. 5. The FIG. 5 according to the present example embodiment is, for example, a data storage medium having a structure in which the IC tag 50 and an antenna 57 are embedded in a molded object of a synthetic resin. The antenna 57 has, for example, a structure in which a metal wire is spirally arranged in the FIG. 5 and both ends thereof are connected to the IC tag 50. The IC tag 50 is provided as one IC chip. The IC tag 50 includes a processor 51, a contactless communication part 52, a storage part 53 and a power supply part 54.

The IC tag 50 does not have a power source such as a battery. The IC tag 50 operates on an electromotive force generated by electromagnetic induction or the like when a radio signal from the game apparatus 1 is received by the antenna 57. The IC tag 50 is a so-called passive-type tag. The power supply part 54 supplies power to the processor 51, the contactless communication part 52, the storage part 53 and the like in the IC tag 50 based on the electromotive force. The operations of the components are performed by this power supply. While the IC tag 50 is of a passive type in the present example embodiment, it may be of an active type.

The contactless communication part 52 of the IC tag 50 receives a signal transmitted from the game apparatus 1 by the antenna 57, and supplies the data related to the received signal to the processor 51. The contactless communication part 52 transmits the data supplied from the processor 51, from the antenna 57 to the game apparatus 1. The storage part 53 is formed of a data rewritable non-volatile memory element. The storage part 53 stores a figure ID (identifier) 53*a* individually assigned to the IC tag 50, game data 53*b* and character data 53*c* related to the game according to the present example embodiment, and the like. According to the data supplied from the contactless communication part 52, the processor 51 reads data from the storage part 53 and supplies the read data to the contactless communication part 52 so as to be transmitted to the game apparatus 1. The processor 51 performs data writing to the storage part 53 according to the data supplied from the contactless communication part 52.

<Game Processing>

Next, an example of the game will be described that is implemented by the processor 10 of the game apparatus 1 executing the game program 91 according to the present example embodiment. In the game of this example, the user selects one player character from among a plurality of characters. The user operates the selected player character with the operation part 12, and performs a fight, a competition or the like with an enemy character. The operation of the enemy character may be performed by the processor 10, or in the case of a communication competition, may be performed by the user of another game apparatus 1.

A plurality of characters selectable as the player character are provided as FIG. 5. The user selects the item of data reading from the FIG. 5, for example, from a menu screen of the game displayed on the display 11 of the game apparatus 1. The processor 10 of the game apparatus 1 displays a message such as "Please touch the FIG. 5" on the display 11, and waits until contactless communication with the IC tag 50 of the FIG. 5 becomes possible. The user selects the FIG. 5 of the character used as the player character, from among the FIG. 5 that the user carries with him/her, and brings the selected FIG. 5 into contact with the predetermined area of the game apparatus 1. By doing this, contactless communication between the game apparatus 1 and the FIG. 5 becomes possible. The data reading part 22 of the processor 10 of the game apparatus 1 reads the figure ID 53*a*, the game data 53*b* and the character data 53*c* stored in the storage part 53 from the IC tag 50 of the FIG. 5.

The figure ID 53*a* of the FIG. 5 is identification information uniquely assigned to this FIG. 5. Even for the FIG. 5 of the same character, different figure IDs 53*a* are stored. The figure ID 53*a* is data that cannot be rewritten. The processor 10 of the game apparatus 1 determines the kind of the character of the FIG. 5 based on the figure ID 53*a* read from the FIG. 5 by the data reading part 22. In the example shown in FIG. 1, the kinds of the characters are a frog, a mouse and an elephant. Since the game apparatus 1 determines the type of the character, data such as a correspondence table of the figure IDs 53*a* assigned to the FIG. 5 and the kinds of the characters is stored in the secondary storage part 17 or the recording medium 9 together with the game program 91.

The game data 53*b* of the FIG. 5 includes identification information for identifying the game according to the present example embodiment and information on the user who played the game. The game apparatus 1 can confirm that this FIG. 5 is one used for the game according to the present example embodiment, based on the identification information included in the game data 53b. The game apparatus 1 can confirm the user of this FIG. 5 based on the user information included in the game data 53b. The game data 53b may be rewritable data.

The character data 53c of the FIG. 5 includes information such as the capability values of the corresponding character. FIG. 4 shows an example non-limiting schematic view showing an example of the character data 53c of the FIG. 5. The character data 53c stored in the storage part 53 of the IC tag 50 of the FIG. 5 includes information such as the game apparatus ID, the character capability values and the update date and time. As described above, data reading and writing from and to the FIG. 5 can be performed on different game apparatuses 1. A game apparatus ID is uniquely assigned to each game apparatus 1, and in the character data 53c of the FIG. 5, the character capability values and the update date and time are stored so as to be associated with the game apparatus ID.

In the character data 53c according to the present example embodiment, the number of sets of character capability values stored for one game apparatus ID is one. For example, when a game apparatus 1 provided with "game apparatus A" as the game apparatus ID (hereinafter, referred to merely as game apparatus A) writes data to the FIG. 5, the information such as the character capability values and the update date and time corresponding to the game apparatus A of the character data 53c is updated. In this case, the information such as the character capability values and the update date and time of the other game apparatus IDs is not updated. When a game apparatus 1 the game apparatus ID of which is not stored in the character data 53c performs data writing, a new game apparatus ID and information such as the character capability values are added to the character data 53c. When the storage part 53 does not have enough free space for adding the new information at this time, the information with the earliest update date and time is deleted and the new information is added. Such data writing control may be performed by the game apparatus 1 or may be performed by the processor 51 of the IC tag 50 of the FIG. 5.

When reading the character data 53c from the FIG. 5, the data reading part 22 of the game apparatus 1 reads not only the information corresponding to its own game apparatus ID but also the information such as the character capability values and the update date and time corresponding to all the game apparatus IDs. The processor 10 of the game apparatus 1 selects the character data 53c with the latest update date and time irrespective of the game apparatus ID from among the read pieces of character data 53c. The processor 10 reflects the selected latest character capability values in the player character of the game.

The user can select the character reflecting the data read from the FIG. 5 to start the game. The processor 10 of the game apparatus 1 starts the game processing with the user selected character as the player character. For example, the game apparatus 1 displays on the display 11 the player character selected by the user and a plurality of enemy characters controlled by the processor 10 of the game apparatus 1. The user can move the player character by using the operation part 12. The user can make the player character attack the enemy characters by using the operation part 12. The processor 10 of the game apparatus 1 determines the success or failure of the player character's attack on the enemy characters according to the user's operation. The processor 10 determines the success or failure of the enemy characters' attacks on the player character.

In the game according to the present example embodiment, the user can obtain points according to the performance in the game or the like. The user can increase the capability values such as the attack power and the speed of the character by using the obtained points. When the growth of the character is selected by the user, for example, from a menu, the processor 10 of the game apparatus 1 displays a character growth screen as shown in FIG. 1. On the character growth screen, by using the operation part 12, the user can appropriately select a capability value such as the attack power or the speed of the character and increase the selected capability value.

After increasing the capability value of the character, the user can write the increased capability value to the FIG. 5 corresponding to this character. The processor 10 of the game apparatus 1 accepts an operation of increasing the capability value by the operation part 12, and increases the capability value of the character. Then, the processor 10 displays a message prompting the user to perform the operation of making the corresponding FIG. 5 be read. In the example shown in FIG. 1, the game apparatus 1 displays a message "Please touch the character the status of which is to be grown" on the display 11. In response to this message, the user brings the FIG. 5 corresponding to the character the capability value of which is increased into contact with the predetermined area of the game apparatus 1. By doing this, contactless communication between the game apparatus 1 and the FIG. 5 is enabled.

The processor 10 of the game apparatus 1 performs contactless communication with the FIG. 5 by the contactless communication part 14 to obtain the figure ID 53a stored in the storage part 53 of the IC tag 50. The processor 10 determines whether or not the FIG. 5 with which the contactless communication is performed corresponds to the character the capability value of which is increased, based on the figure ID 53a obtained from the FIG. 5. When the FIG. 5 with which the contactless communication is performed does not correspond to the character the capability value of which is increased, the processor 10 displays an error message or the like on the display 11. When the FIG. 5 corresponds to the character the capability value of which is increased, the processor 10 transmits by the contactless communication part 14 a data rewriting instruction to the FIG. 5 together with information such as the new capability value. The IC tag 50 of the FIG. 5 updates the character data 53c stored in the storage part 53 in response to the rewriting instruction from the game apparatus 1. As described above, by updating the character data 53c stored in the storage part 53 of the FIG. 5, even when performing the game with another game apparatus 1, the user can enjoy the game by using the character the capability value of which is increased.

<Restoration of Corrupted Data>

In the information processing system according to the present example embodiment, when contactless communication between the game apparatus 1 and the FIG. 5 does not end normally and an anomaly occurs in the data writing to corrupt the data stored in the storage part 53 of the FIG. 5, the processing of restoring the corrupted data is performed. To do this, the game apparatus 1 according to the present example embodiment stores the data written to the FIG. 5 into the secondary storage part 17 as the character data 18 for backup.

FIG. 5 shows an example non-limiting schematic view showing an example of the character data 18 of the game apparatus 1. The character data 18 that the game apparatus 1 stores in the secondary storage part 17 includes information such as the figure ID, the character capability values and the update date and time. As described above, each FIG. 5 stores a uniquely assigned figure ID 53a in the storage part 53. In the character data 18 of the game apparatus 1, information such as the character capability values and the update date and time is stored so as to be associated with the figure ID.

When the user increases a capability value of the character and writes the data to the FIG. 5 by contactless communication, the processor 10 of the game apparatus 1 performs storage of the character data 18 in the secondary storage part 17. At this time, the processor 10 stores information such as the character capability values and the update date and time the same as that written to the FIG. 5, in the character data 18 in the secondary storage part 17 so as to be associated with the figure ID of the FIG. 5. In the character data 18 according to the present example embodiment, the number of sets of information such as the character capability values stored for one figure ID is one. For example, when data writing is performed to a FIG. 5 provided with "figure a" as the figure ID (hereinafter, referred to merely as figure a), the processor 10 updates the information such as the character capability values and the update date and time corresponding to the figure a of the character data 18. In this case, the information corresponding to the other FIG. 5 is not updated. When data writing is performed to a FIG. 5 the figure ID of which is not stored in the character data 18, the processor 10 adds information such as a new figure ID and the character capability values to the character data 18.

When reading data from the FIG. 5, the game apparatus 1 according to the present example embodiment determines whether data is corrupted or not for the game data 53b and the character data 53c stored in the storage part 53 of the FIG. 5. To each of the game data 53b and the character data 53c of the FIG. 5, information for error detection such as a parity code, a cyclic code or a checksum is attached. After the data reading part 22 reads the game data 53b and the character data 53c from the FIG. 5, the processor 10 of the game apparatus 1 determines the presence or absence of data corruption by the corruption determination part 24 checking the information for error detection attached to these pieces of data.

When the corruption determination part 24 determines that the data is not corrupted, the game processing part 23 performs the game processing based on the data read from the FIG. 5 as described above. When the corruption determination part 24 determines that the data is corrupted, the processor 10 does not perform the game processing by the game processing part 23, and starts the corrupted data restoration processing. The processor 10 determines by the storage determination part 25 whether the data determined to be corrupted is stored in the character data 18 in the secondary storage part 17 or not. The storage determination part 25 determines whether the data determined to be corrupted is stored in the secondary storage part 17 or not according to whether the figure ID 53a read from the FIG. 5 is included in the character data 18 or not.

When the data determined to be corrupted is not stored in the secondary storage part 17, the processor 10 cannot restore the data for this FIG. 5. Therefore, the processor 10 performs data initialization processing by the initialization part 26. However, before performing the data initialization processing, the processor 10 notifies the user of the corruption by the corruption notification part 27, and accepts a selection of whether to perform the initialization of the FIG. 5 or not by the selection accepting part 28. The corruption notification part 27 displays a message on the display 11 to thereby provide notification of the corruption. The corruption notification message may be, for example, "The data of this figure is corrupted" or "Data reading failed". After or simultaneously with the message display by the corruption notification part 27, the selection accepting part 28 displays on the display 11 a message prompting the user to select whether to perform the initialization processing or not. The message related to the selection may be, for example, "Initialize the data of this figure?" or "Initialize the data?" The selection accepting part 28 accepts the selection of whether to perform the initialization processing or not based on the operation on the operation part 12 performed in response to this message.

When the selection accepting part 28 accepts a selection of performing the initialization processing, the initialization part 26 provides an initialization instruction, a data writing instruction, a data deletion instruction or the like by the contactless communication part 14. Thereby, the initialization part 26 initializes the data in the storage part 53 of the FIG. 5. The figure ID 53a stored in the storage part 53 of the FIG. 5 is unrewritable data and is never rewritten by the initialization processing. The game data 53b of the storage part 53 may be rewritten by the initialization processing by the initialization part 26, or does not necessarily have to be rewritten when it is not corrupted. The character data 53c of the storage part 53 is all deleted by the initialization processing by the initialization part 26.

When the data determined to be corrupted is stored in the secondary storage part 17, the processor 10 can read this data from the secondary storage part 17 and write it to the FIG. 5. By doing this, the processor 10 can restore the corrupted data in the FIG. 5. However, before restoring the data, the processor 10 notifies the user of the corruption by the corruption notification part 27, and accepts a selection of whether to perform data restoration or not by the selection accepting part 28. After or simultaneously with the notification by the corruption notification part 27, the selection accepting part 28 displays on the display 11 a message prompting the user to select whether to perform data restoration or not. The message related to the selection may be, for example, "Rewrite the data in the figure?" or "Restore the data?" The selection accepting part 28 accepts the selection of whether to perform data restoration or not based on the operation on the operation part 12 performed in response to this message.

When a selection of not performing data restoration is accepted, the processor 10 does not restore the data in the FIG. 5. In this case, this FIG. 5 cannot be used for the game until data restoration or initialization is performed. However, in the data restoration of the information processing system according to the present example embodiment, when there is more than one game apparatus 1 with which the user played the game by using this FIG. 5, the result differs according to at which game apparatus 1 data restoration is performed. Therefore, by performing data restoration not forcibly but according to the user's selection, an option for the user to select the game apparatus 1 at which data restoration is performed can be left.

When a selection of performing data restoration is accepted, the processor 10 reads the data corresponding to the figure ID of the FIG. 5 to be restored, from the character data 18 stored in the secondary storage part 17. The processor 10 performs data restoration by the data writing part 21 writing the read data to the FIG. 5. Some methods are considered for the data restoration by the game apparatus 1. Therefore, a plurality of data restoration method examples will be described below.

(Data Restoration Method 1)

Figure 6:
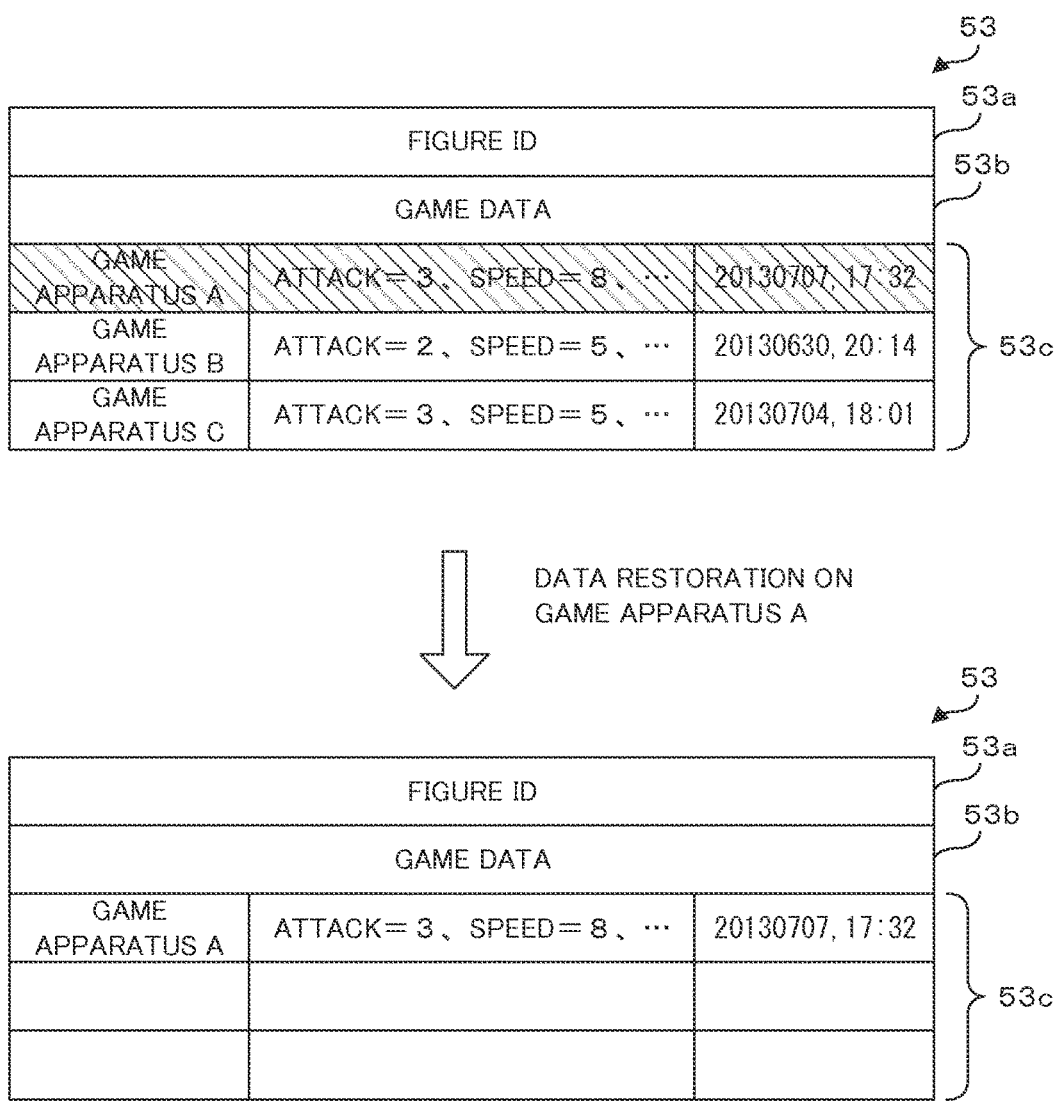
FIG. 6 shows an example non-limiting schematic view for explaining a first data restoration method by the game apparatus.
Figure 7:
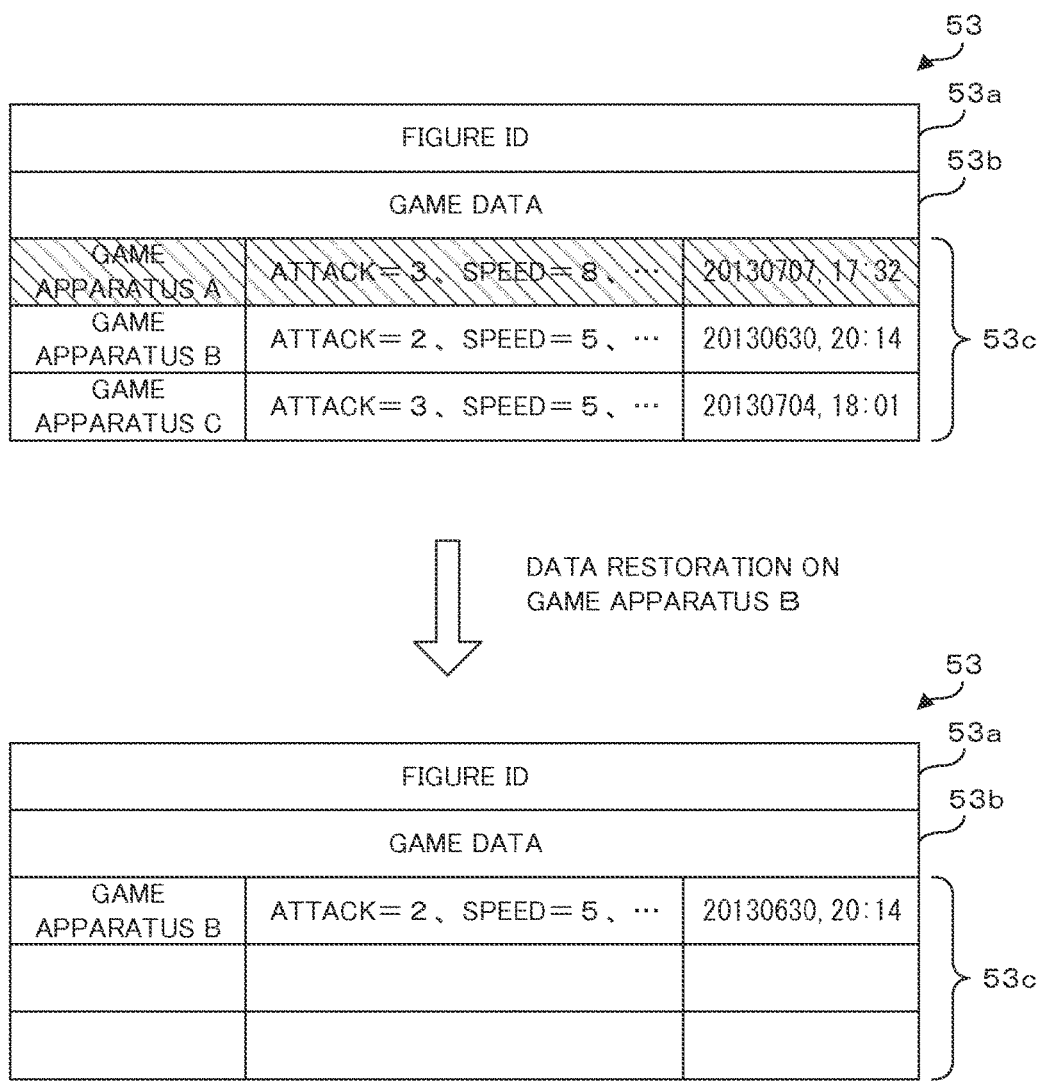
FIG. 7 shows an example non-limiting schematic view for explaining the first data restoration method by the game apparatus.

FIGS. 6 and 7 show example non-limiting schematic views for explaining a first data restoration method by the game apparatus 1. In these figures, with respect to an example of the data stored in the storage part 53 of the FIG. 5, a condition before the data restoration is shown in the upper part and a condition after the data restoration is shown in the lower part. For example, in the upper parts of FIGS. 6 and 7, the storage part 53 stores the figure ID 53a, the game data 53b and three pieces of character data 53c written on the game apparatuses A to C. At this time, the hatching in the figure indicates that the character data 53c written on the game apparatus A is corrupted. The same applies to FIGS. 8 and 9 described later.

In the first data restoration method, in cases where any data included in the character data 53c is corrupted, the data stored in the game apparatus 1 performing data restoration is written, and the remaining data is deleted. The example shown in FIG. 6 is a case where the character data 53c written on the game apparatus A is corrupted and data restoration is performed on the game apparatus A. In this case, the processor 10 of the game apparatus A writes data read from the character data 18 stored in its own secondary storage part 17, to the storage part 53 of the FIG. 5. The processor 10 deletes the data written on the other game apparatuses B and C from the storage part 53.

The example shown in FIG. 7 is a case where the character data 53c written on the game apparatus A is corrupted and data restoration is performed on the game apparatus B. In this case, the processor 10 of the game apparatus B writes the data read from the character data 18 stored in its own secondary storage part 17, to the storage part 53 of the FIG. 5. The processor 10 of the game apparatus B deletes the data written on the other game apparatuses A and C from the storage part 53. In this case, since the data of the game apparatus B in the FIG. 5 is not corrupted, the following may be performed: The processor 10 of the game apparatus B performs only the processing of deleting the data of the other game apparatuses A and C without performing data writing. However, it is desirable that the processor 10 of the game apparatus B determine that the data of the game apparatus B in the FIG. 5 and the data stored in its own secondary storage part 17 coincide with each other.

(Data Restoration Method 2)

Figure 8:
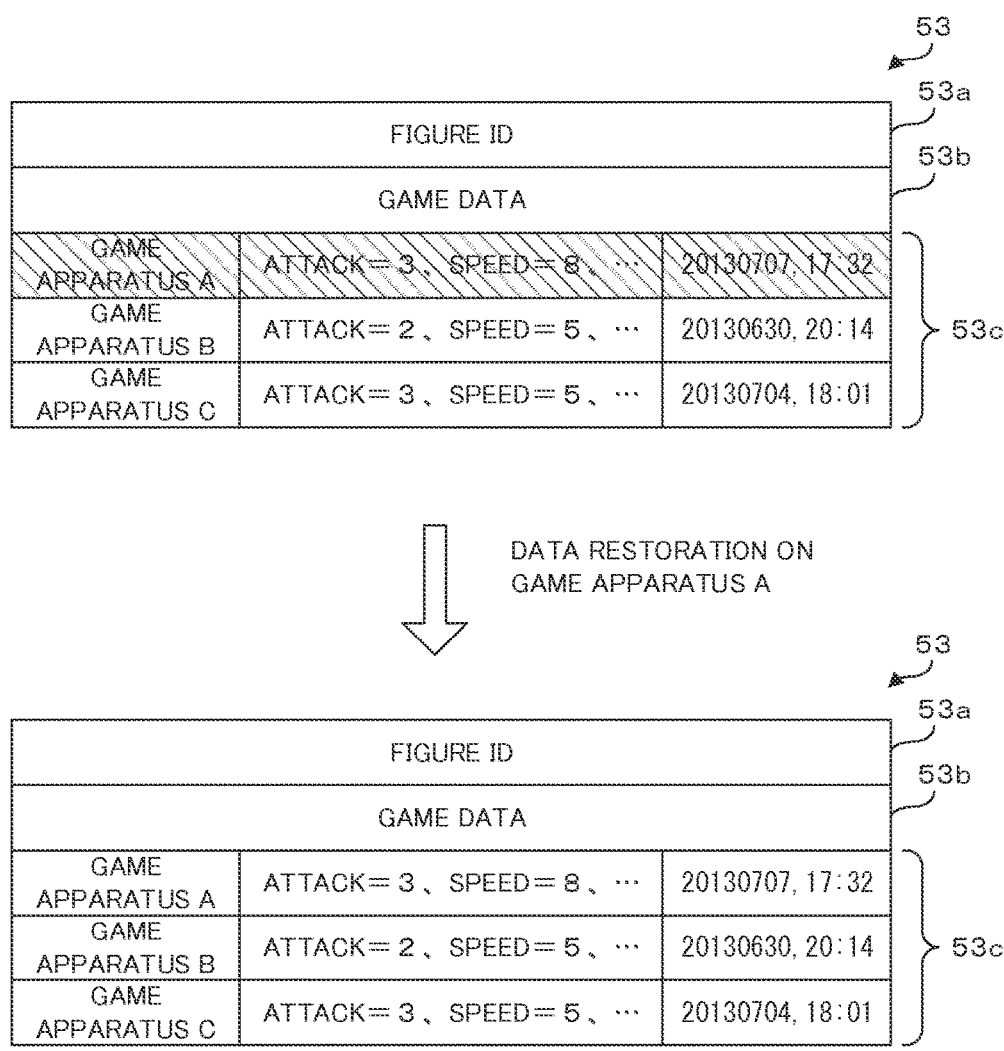
FIG. 8 shows an example non-limiting schematic view for explaining a second data restoration method by the game apparatus.
Figure 9:
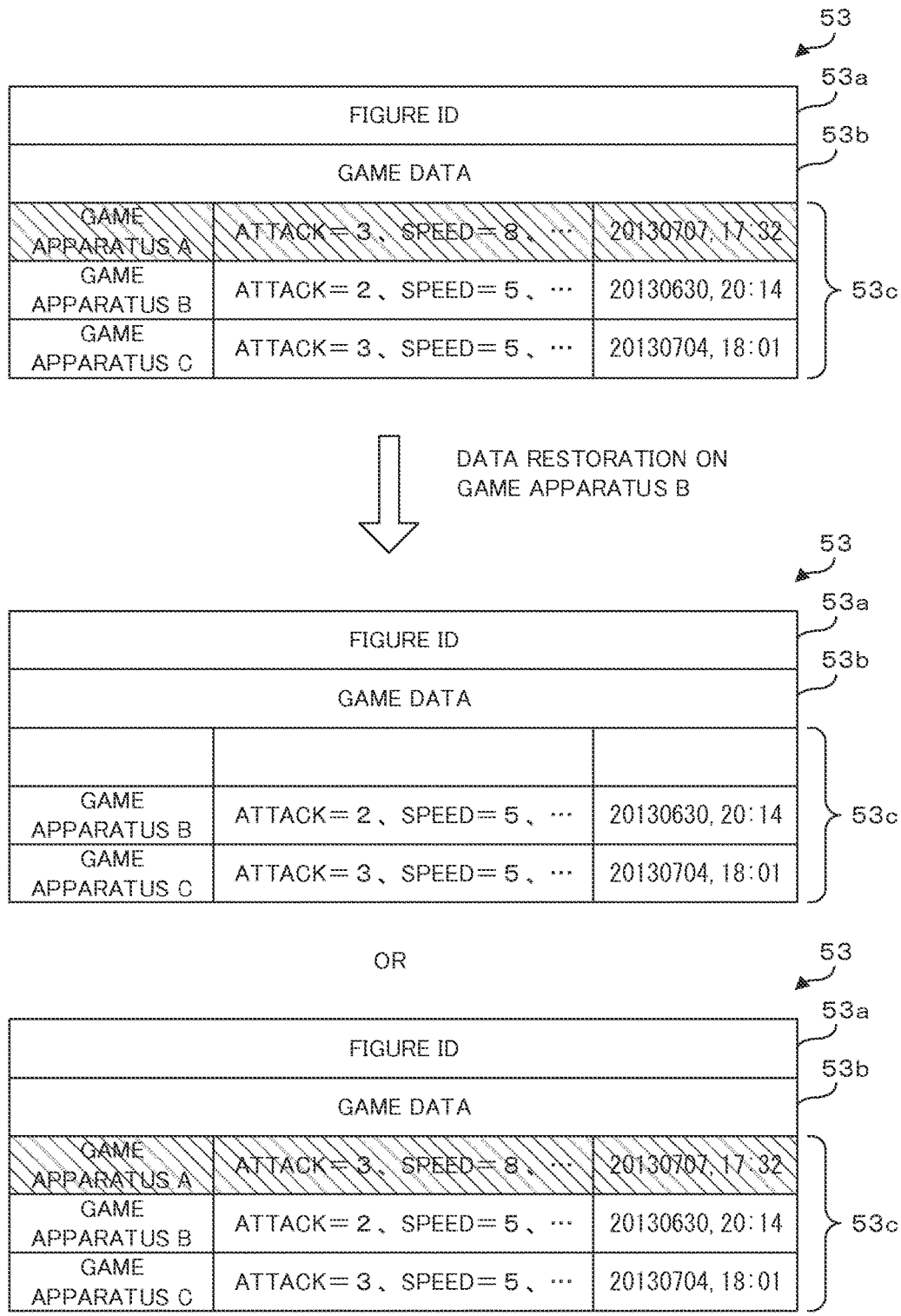
FIG. 9 shows an example non-limiting schematic view for explaining the second data restoration method by the game apparatus.

FIGS. 8 and 9 show example non-limiting schematic views for explaining a second data restoration method by the game apparatus 1. In the second data restoration method, in cases where any of the data included in the character data 53c is corrupted, the game apparatus 1 restores this corrupted data. However, the game apparatus 1 does not perform rewriting, deletion or the like on the uncorrupted data. The example shown in FIG. 8 is a case where the character data 53c written on the game apparatus A is corrupted and data restoration is performed on the game apparatus A. In this case, the processor 10 of the game apparatus A writes the data read from the character data 18 stored in its own secondary storage part 17, to the storage part 53 of the FIG. 5. The processor 10 of the game apparatus A does not perform rewriting, deletion or the like on the data of the other game apparatuses B and C.

The example shown in FIG. 9 is a case where the character data 53c written on the game apparatus A is corrupted and data restoration is performed on the game apparatus B. In this case, since the data used for the data restoration is not stored in its own secondary storage part 17, the processor 10 of the game apparatus B deletes the data of the game apparatus A from the storage part 53 of the FIG. 5 as shown in the middle part of FIG. 9. Alternatively, the processor 10 of the game apparatus B may leave the corrupted data of the game apparatus A as it is without performing rewriting, deletion or the like as shown in the lower part of FIG. 9.

As described above, a plurality of methods are considered as the data restoration method. The game apparatus 1 may adopt any of the above-described first and second data restoration methods, or may adopt a data restoration method other than them.

In the information processing system according to the present example embodiment, the presence or absence of corruption is also determined for the game data 53b of the FIG. 5. When the game data 53b is corrupted, even if the character data 53c is not corrupted, the game apparatus 1 restores the data in the FIG. 5. In this case, the processor 10 of the game apparatus 1 writes new game data 53b to the storage part 53 of the FIG. 5. The processor 10 performs data restoration, for example, by the above-described first or second data restoration method for the character data 53c stored in the storage part 53.

<Processing Procedure>

Figure 10:
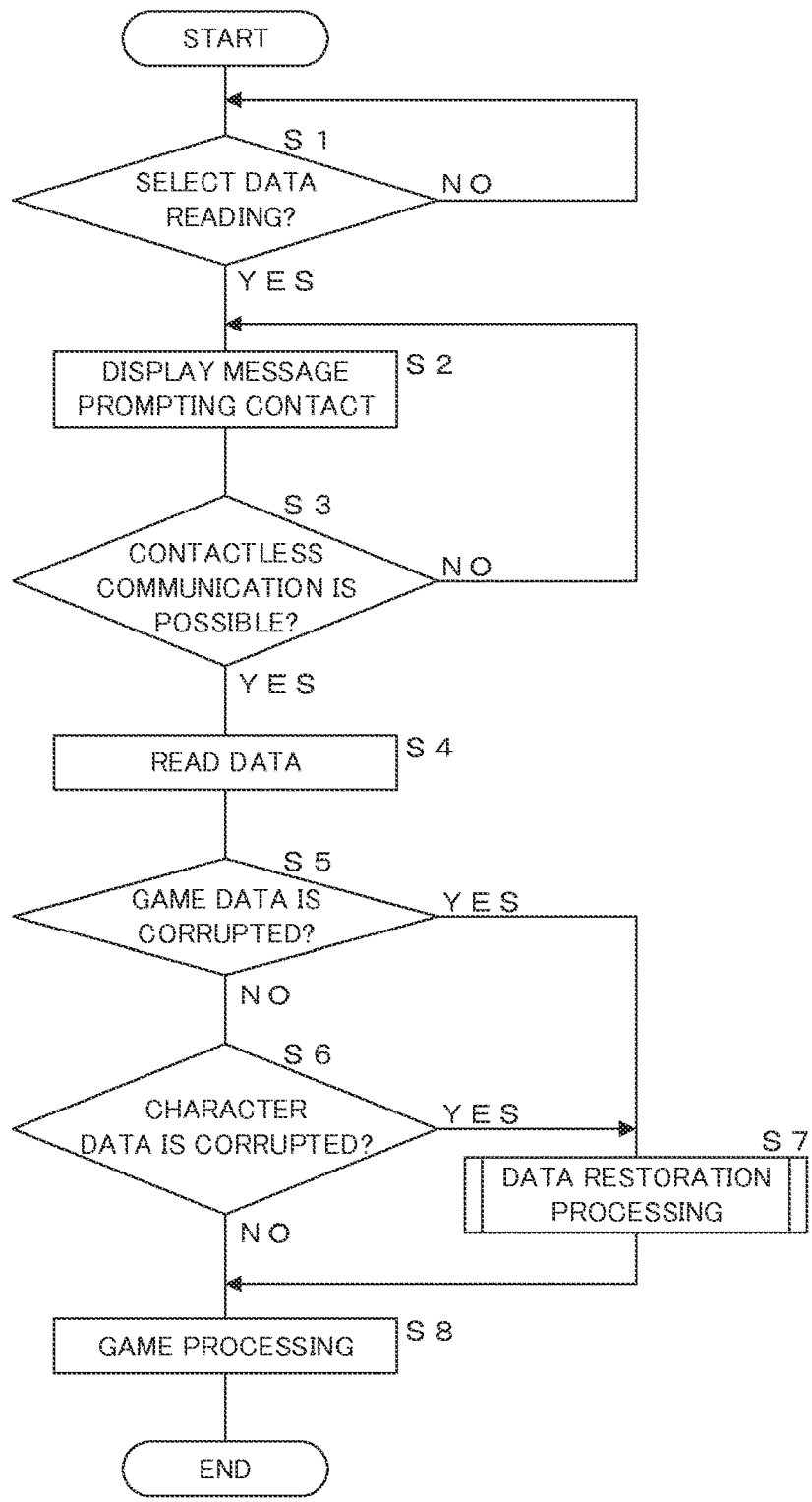
FIG. 10 shows an example non-limiting flowchart showing the procedure of the data reading processing performed by the game apparatus.

FIG. 10 shows an example non-limiting flowchart showing the procedure of the data reading processing performed by the game apparatus 1. The processor 10 of the game apparatus 1 determines whether or not the item of data reading from FIG. 5 is selected, for example, from a menu screen related to the game displayed on the display 11 (step S1). When the item of data reading is not selected (S1: NO), the processor 10 waits until the item of data reading is selected.

When the item of data reading is selected (S1: YES), the processor 10 displays on the display 11 a message prompting the user to bring the FIG. 5 into contact with the predetermined area of the game apparatus 1 (step S2). The processor 10 transmits to the FIG. 5, for example, an instruction to periodically transmit the figure ID 53a by the contactless communication part 14. The processor 10 determines whether contactless communication with the FIG. 5 has become possible or not, for example, according to whether the figure ID 53a has been obtained or not as a response to this transmission instruction (step S3). When contactless communication with the FIG. 5 has not become possible (S3: NO), the processor 10 returns the process to step S2 to continue the message display.

When contactless communication with the FIG. 5 becomes possible (S3: YES), the data reading part 22 of the processor 10 reads data such as the game data 53b and the character data 53c stored in the storage part 53 of the FIG. 5 by the contactless communication (step S4). The corruption determination part 24 of the processor 10 determines whether the game data 53b read from the FIG. 5 is corrupted or not (step S5). When the game data 53b is not corrupted (S5: NO), the corruption determination part 24 determines whether the character data 53c read from the FIG. 5 is corrupted or not (step S6).

When the character data 53c is not corrupted (S6: NO), the game processing part 23 of the processor 10 performs the game processing based on the read data (step S8), and ends the game processing. On the other hand, when the game data 53b is corrupted (S5: YES) or when the character data 53c is corrupted (S6: YES), the processor 10 restores the data in the FIG. 5 (step S7). After restoring the data, the processor 10 performs the game processing (step S8), and ends the processing.

Figure 11:
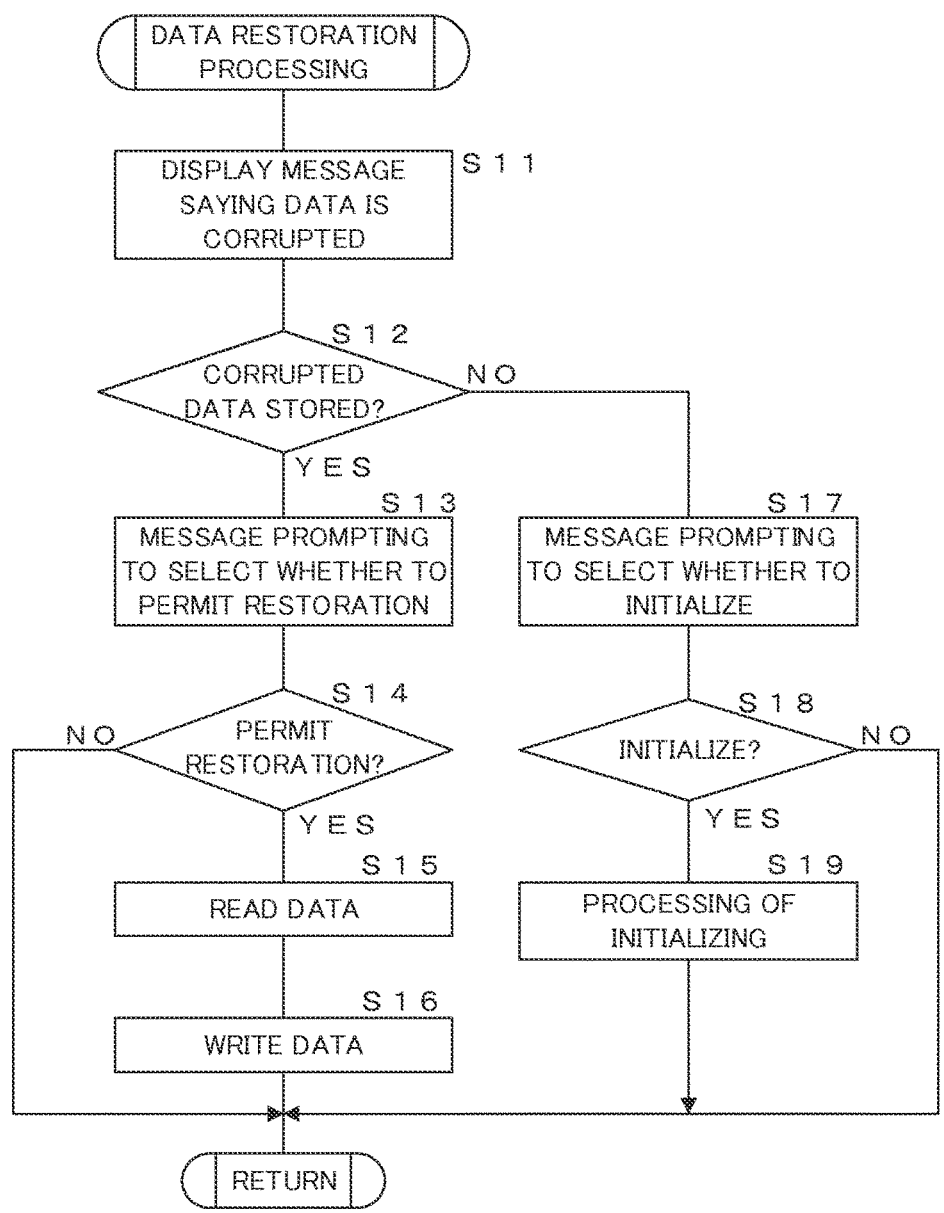
FIG. 11 shows an example non-limiting flowchart showing the procedure of the data restoration processing performed by the game apparatus.

FIG. 11 shows an example non-limiting flowchart showing the procedure of the data restoration processing performed by the game apparatus 1. The processing shown in this flowchart is the processing performed at step S7 of the flowchart shown in FIG. 10. In the data restoration processing, the corruption notification part 27 of the processor 10 of the game apparatus 1 displays on the display 11 a message saying that the data in the FIG. 5 is corrupted (step S11). The storage determination part 25 of the processor 10 determines whether data the same as the corrupted data in the FIG. 5 is stored in the character data 18 in the secondary storage part 17 or not (step S12).

When the corrupted data in the FIG. 5 is stored in the secondary storage part 17 (step S12: YES), the processor 10 displays on the display 11 a message prompting the user to select whether to permit restoration of the data in the FIG. 5 or not (step S13). The selection accepting part 28 of the processor 10 accepts the selection of whether to permit data restoration or not based on the operation performed on the operation part 12, and determines whether a selection of permitting data restoration is made or not (step S14). When a selection of permitting data restoration is made (S14: YES), the processor 10 reads the data corresponding to the FIG. 5 to be restored, from the secondary storage part 17 (step S15). The data writing part 21 of the processor 10 writes the data read from the secondary storage part 17 to the storage part 53 of the FIG. 5 by contactless communication (step S16), and ends the processing. When a selection of not permitting data restoration is made (S14: NO), the processor 10 ends the processing without performing data restoration.

When the corrupted data in the FIG. 5 is not stored in the secondary storage part 17 (S12: NO), the processor 10 displays on the display 11 a message prompting the user to select whether to initialize the data in the FIG. 5 or not (step S17). The processor 10 accepts the selection of whether to perform the initialization processing or not based on the operation performed on the operation part 12, and determines whether a selection of performing the initialization processing is made or not (step S18). When a selection of performing the initialization processing is made (S18: YES), the processor 10 performs the processing of initializing the data in the storage part 53 of the FIG. 5 (step S19), and ends the processing. When a selection of not performing initialization is made (S18: NO), the processor 10 ends the processing without performing the initialization processing.

Figure 12:
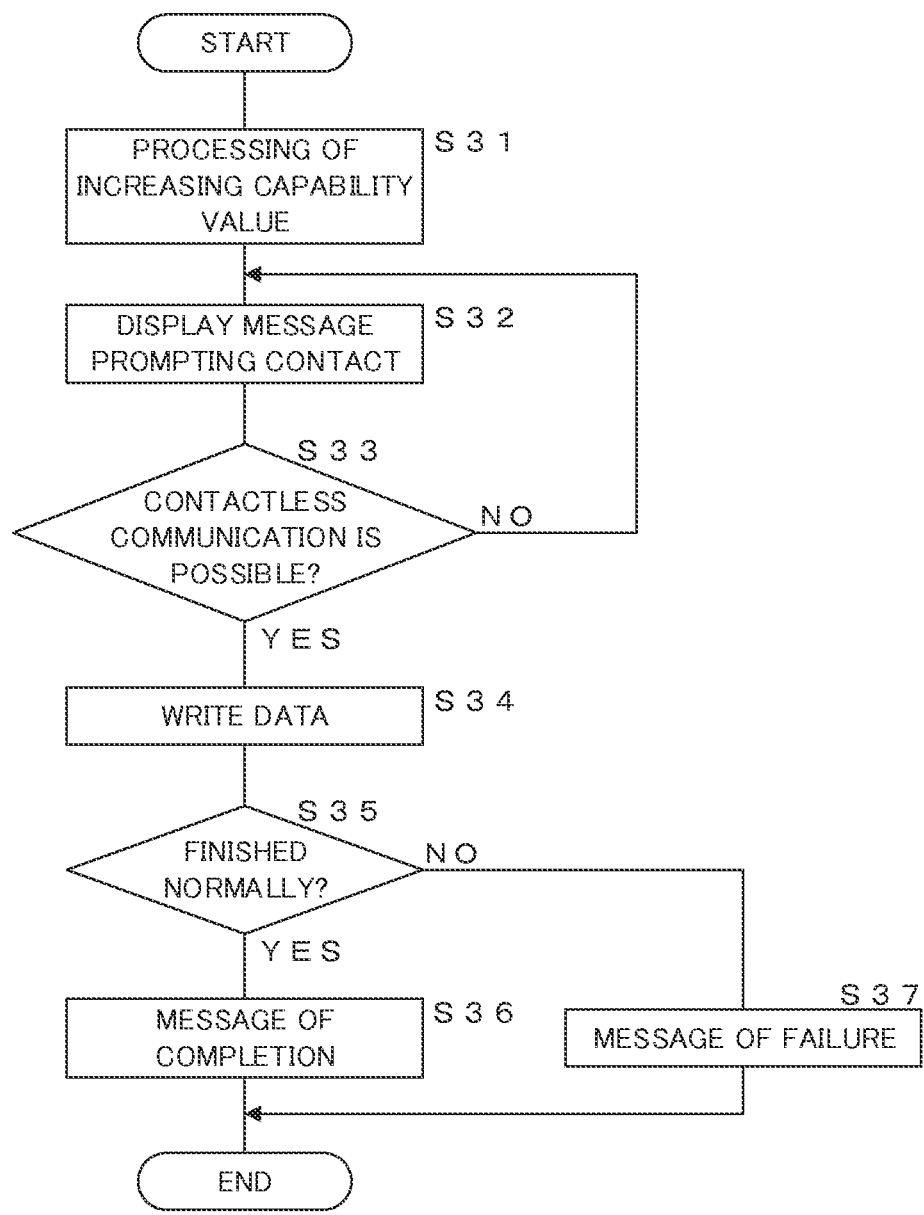
FIG. 12 shows an example non-limiting flowchart showing the procedure of the data writing processing performed by the game apparatus.

FIG. 12 shows an example non-limiting flowchart showing the procedure of the data writing processing performed by the game apparatus 1. In the game processing by the game processing part 23, the processor 10 of the game apparatus 1 performs the processing of increasing a capability value of the game character based on the operation on the operation part 12 (step S31). After the capability value increase processing, the processor 10 displays on the display 11 a message prompting the user to bring the FIG. 5 into contact with the predetermined area of the game apparatus 1 (step S32). The processor 10 determines whether contactless communication with the FIG. 5 has become possible or not (step S33). When contactless communication with the FIG. 5 has not become possible (S33: NO), the processor 10 returns the process to step S32 to continue the message display.

When contactless communication with the FIG. 5 has become possible (S33: YES), the data writing part 21 of the processor 10 writes data including the increased capability value to the FIG. 5 by contactless communication (step S34). The processor 10 determines whether data writing is finished normally or not, for example, based on the presence or absence of a writing completion response from the FIG. 5 (step S35). When data writing is finished normally (S35: YES), the processor 10 displays on the display 11 a message saying that data writing is completed (step S36), and ends the processing. When data writing is not finished normally (S35: NO), the processor 10 displays on the display 11 a message saying that data writing failed (step S37), and ends the processing. When it is determined that data writing is not finished normally, there is a possibility that the data stored in the storage part 53 of the FIG. 5 is corrupted.

SUMMARY

The information processing system of the present example embodiment having the above-described structure has a structure in which the contactless communication part 14 of the game apparatus 1 performs contactless communication with the contactless communication part 52 of the IC tag 50 of the FIG. 5 and the data writing part 21 of the game apparatus 1 writes data related to the game to the storage part 53 of the FIG. 5. The processor 10 of the game apparatus 1 stores the data written to the FIG. 5 by the data writing part 21, into the secondary storage part 17 as backup data. When reading data from the FIG. 5, the processor 10 of the game apparatus 1 determines by the corruption determination part 24 whether the data stored in the storage part 53 of the FIG. 5 is corrupted or not. When the data is corrupted, the data writing part 21 of the game apparatus 1 writes the data stored in the secondary storage part 17 as backup data, to the FIG. 5 to thereby restore data. By doing this, the FIG. 5 can be prevented from becoming unusable for the game due to data corruption.

The game apparatus 1 is capable of performing contactless communication with a plurality of different FIG. 5. In the game apparatus 1, data is stored in the character data 18 in the secondary storage part 17 so as to be associated with the figure ID to identify the FIG. 5. When it is determined that the data in the FIG. 5 is corrupted, the processor 10 of the game apparatus 1 reads the data corresponding to the figure ID of this FIG. 5 from the secondary storage part 17 and performs writing by the data writing part 21. Thereby, a game using a plurality of FIG. 5 can be realized.

In the game apparatus 1, when it is determined that the data in the FIG. 5 is corrupted, the storage determination part 25 determines whether the backup of the corrupted data is stored in the secondary storage part 17 or not. When the backup of the corrupted data is stored in the secondary storage part 17, the data writing part 21 of the processor 10 reads this data from the secondary storage part 17 and writes it to the FIG. 5. When the backup of the corrupted data is not stored in the secondary storage part 17, the initialization part 26 of the processor 10 initializes the storage part 53 of the FIG. 5. This enables the game apparatus 1 to perform appropriate processing according to whether the backup data of the FIG. 5 is stored or not.

When it is determined that the data in the FIG. 5 is corrupted, the game apparatus 1 displays a message notifying the user of this on the display 11. The game apparatus 1 displays, together with this message, a message prompting the user to select whether to perform data restoration or initialization, or not, and the selection accepting part 28 accepts the selection. This allows the user to recognize data corruption and determine whether to perform data restoration or initialization, or not.

In the game apparatus 1, the game processing part 23 performs the game processing while the character capability values included in the data read from the FIG. 5 by the data reading part 22 are reflected in the capability values of the player character or the like. The user can increase a character capability value in the game. The data writing part 21 of the game apparatus 1 writes data including the increased character capability value to the FIG. 5. This enables the user to grow the character through playing of the game and store the capability value to the FIG. 5. For example, even when the game is played with a different user's game apparatus 1 such as a game apparatus 1 possessed by a friend, the game can be enjoyed by using the grown character by the data in the FIG. 5 being read to the game apparatus 1.

The FIG. 5 stores in the storage part 53 the character data 53*c* (first data) updated according to the play of the game and the game data 53*b* (second data) including user information and the like. The corruption determination part 24 of the game apparatus 1 performs determination of corruption of the game data 53*b* and when the game data 53*b* is not corrupted, performs determination of corruption of the character data 53*c*. When the character data 53*c* or the game data 53*b* is corrupted, the processor 10 of the game apparatus 1 writes the data to the FIG. 5 by the data writing part 21. This enables the game apparatus 1 to perform data restoration more reliably for corruption of the data in the FIG. 5.

While in the present example embodiment, description is given by using as an example a game where a player character operated by the user attacks enemy characters, the contents of the game are an example and the example embodiment is not limited thereto. While the character capability values are stored in the storage part 53 of the FIG. 5, the example embodiment is not limited thereto. For example, the stages appearing in the game and the weapons, the items or the like used by the player character may be stored in a data storage medium, or other data may be stored therein. The structure of the display screen shown in FIG. 1 is an example and the example embodiment is not limited thereto.

The technology herein may be applied not only to games but also to various other applications. For example, in an application that assists in learning English, kanji characters or the like, when information such as examination results is written to a data storage medium by contactless communication, a similar structure may be applied. In any case, the technology herein may be applied to structures in which data generated or updated by information processing is written to a data storage medium by contactless communication.

While description is given by using the portable game apparatus 1 as an example in the present example embodiment, the example embodiment is not limited thereto. A similar technology may be applied to various information processing apparatuses such as stationary game apparatuses, general-purpose computers, tablet terminal apparatuses and mobile telephones. In the case of stationary game apparatuses, the contactless communication part 14 may be incorporated in a transportable controller or the like instead of being incorporated in the main unit. In the case of an apparatus such as a general-purpose computer that does not incorporate the contactless communication part 14, a different apparatus that performs contactless communication may be connected by cable or by radio.

While the data storage medium is the FIG. 5, the example embodiment is not limited thereto, and the data storage medium may be an IC card or the like or may be a different medium. While the game apparatus 1 performs contactless communication according to the NFC standard, the example embodiment is not limited thereto, and contactless communication may be performed according to a different communication standard. Some or all of the processings performed by the processor 10 of the game apparatus 1 may be performed by a different apparatus such as a server apparatus so that the processings are implemented through collaboration between a plurality of apparatuses.

While the components from the data writing part 21 to the selection accepting part 28 are provided as software functional blocks in the processor 10 by the processor 10 of the game apparatus 1 executing the game program 91, the example embodiment is not limited thereto. Some functions of the components from the data writing part 21 to the selection accepting part 28 may be provided, for example, as functions of the OS (operating system). Some of the components from the data writing part 21 to the selection accepting part 28 may be provided as hardware functional blocks.

While the game apparatus 1 is structured so that the game data 53*b* and the character data 53*c* are written to the FIG. 5 as the data restoration processing when the game data 53*b* of the FIG. 5 is corrupted, the example embodiment is not limited thereto. For example, the game apparatus 1 may be structured so that only the game data 53*b* which is corrupted is written when the character data 53*c* is not corrupted. While the figure ID 53*a* of the FIG. 5 is unrewritable, the example embodiment is not limited thereto, and the figure ID 53*a* may be rewritable.

While in the present example embodiment, the IC tag 50 is provided in the FIG. 5 and the IC tag 50 performs data storage, communication with the game apparatus 1 and the like, the example embodiment is not limited thereto. For example, a circuit board mounted with a CPU, a memory IC, an IC for contactless communication and the like may be provided in the FIG. 5 to perform data storage, communication with the game apparatus 1 and the like. While the IC tag 50 is of a passive type having no power source such as a battery in the present example embodiment, an active-type IC tag may be adopted.

While the information processing apparatus and the data storage medium perform communication according to the NFC standard in the present example embodiment, the example embodiment is not limited thereto. The communication between the information processing apparatus and the data storage medium may be performed according to any communication standard. For example, the information processing apparatus and the data storage medium may perform communication according to a standard such as RFID. Moreover, for example, the information processing apparatus and the data storage medium may perform communication through a physical or electric contact instead of contactless communication.

It is to be understood that elements and the like in singular form preceded by an article "a" or "an" each do not exclude more than one element related thereto when used in the present specification.

The information processing apparatus according to the present example embodiment stores data written to the data storage medium, and performs rewriting when the data in the data storage medium is corrupted. By doing this, corruption of the data in the data storage medium can be handled.

What is claimed is:
1. An information processing apparatus comprising:
   a contactless communication part that performs contactless communication with an IC tag having a contactless communication function;

a data writing part that writes, using the contactless communications part, data to the IC tag;

a storage part that stores data to be written by the data writing part, wherein the data is stored in association with identification information of the IC tag, and wherein the storage part has stored therein a plurality of other data each of which is stored in association with a respective other IC tag;

a data reading part that, using the contactless communication part, reads data stored in the IC tag;

an information processor that performs information processing for a game by using data read from the IC tag by the data reading part and updates the read data, wherein the data writing part writes the updated data to the data storage medium, wherein the read data and the updated data include data specifying one or more attributes of a character in the game; and a corruption determination part that determines, based upon at least a first data read from the IC tag by the data reading part, whether the first data stored in the IC tag is corrupted, wherein when the corruption determination part determines that the first data stored in the IC tag is corrupted, the data writing part writes a second data stored in the storage part in association with identification information of the IC tag to the IC tag, and wherein the first data and the second data include data specifying said one or more attributes of the character.

2. The information processing apparatus according to claim 1, wherein the contactless communication part is capable of performing contactless communication with a plurality of different IC tags, the storage part stores data corresponding to each of the IC tags so that the data corresponding to each of the IC tags can be identified, and when the corruption determination part determines that data stored in an IC tag is corrupted, the data writing part obtains the data corresponding to the IC tag from the storage part and writes the obtained data to the IC tag.

3. The information processing apparatus according to claim 1, comprising a storage determination part that determines, when the corruption determination part determines that the first data stored in the IC tag is corrupted, whether the second data corresponding to the IC tag is stored in the storage part, wherein when the storage determination part determines that the second data corresponding to the IC tag is stored in the storage part, the data writing part writes the second data stored in the storage part to the IC tag.

4. The information processing apparatus according to claim 3, comprising an initialization part that initializes the IC tag when the storage determination part determines that the second data corresponding to the IC tag is not stored in the storage part.

5. The information processing apparatus according to claim 4, comprising:

a corruption notification part that provides notification of data corruption when the storage determination part determines that the second data is not stored in the storage part; and a selection accepting part that accepts a selection of whether or not initialization to be performed by the initialization part.

6. The information processing apparatus according to claim 3, comprising:

a corruption notification part that provides notification of data corruption when the storage determination part determines that the second data is not stored in the storage part; and a selection accepting part that accepts a selection of whether or not the second data stored in the storage part is to be written to the IC tag by the data writing part.

7. The information processing apparatus according to claim 1, wherein the corruption determination part makes the determination when the data reading part reads the first data.

8. The information processing apparatus according to claim 1, wherein the IC tag stores said updated data updated by the information processor and third data other than the updated data, the corruption determination part performs determination of corruption of the updated data after performing determination of corruption of the third data and determining that the third data is not corrupted, and when the corruption determination part determines that the updated data is corrupted, the data writing part writes the updated data and the third data stored in the storage part to the data storage medium.

9. An information processing system comprising:

a contactless communication part that performs contactless communication with an IC tag having a contactless communication function;

a data writing part that writes, using the contactless communications part, data to the IC tag;

a storage part that stores data to be written by the data writing part, wherein the data is stored in association with identification information of the IC tag, and wherein the storage part has stored therein a plurality of other data each of which is stored in association with a respective other IC tag;

a data reading part that, using the contactless communication part, reads data stored in the IC tag;

an information processor that performs information processing for a game by using data read by the data reading part and updates the read data, wherein the data writing part writes the updated data to the IC tag, wherein the read data and the updated data include data specifying one or more attributes of a character in the game; and a corruption determination part that determines, based upon at least a first data read from the IC tag by the data reading part, whether the first data stored in the IC tag is corrupted, wherein when the corruption determination part determines that the first data stored in the IC tag is corrupted, the data writing part writes second data stored in the storage part in association with identification information of the IC tag to the IC tag, wherein the first data and the second data include data specifying said one or more attributes of the character.

10. An information processing method comprising:

performing contactless communication with an IC tag having a contactless communication function and writing data to the IC tag by contactless communication;

storing, to a storage part, data to be written to the IC tag by contactless communication, wherein the data is stored in association with identification information of the IC tag, and wherein the storage part has stored therein a plurality of other data each of which is stored in association with a respective other IC tag;

reading, using contactless communication, data stored in the IC tag;

performing information processing for a game using data read from the IC tag and updating the read data, wherein the updated data is written by the information processor to the IC tag using contactless communication, wherein the read data and the updated data include data specifying one or more attributes of a character in the game;

determining, based upon at least a first data read using contactless communication from the IC tag, whether the first data stored in the IC tag is corrupted; and writing second data stored in the storage part in association with identification information of the IC tag to the IC tag when it is determined that the first data stored in the IC tag is corrupted, wherein the first data and the second data include data specifying said one or more attributes of the character.

11. A non-transitory recording medium recording a computer program that causes a computer to operate as:

a data writing part that performs contactless communication with an IC tag having a contactless communication function and writes data to the IC tag;

a storage processing part that performs processing of storing data to be written by the data writing part, to a storage part, wherein the data is stored in association with identification information of the IC tag, and wherein the storage part has stored therein a plurality of other data each of which is stored in association with a respective other IC tag;

a data reading part that, using contactless communication, reads data stored in the IC tag;

an information processor that performs information processing for a game by using data read from the IC tag by the data reading part and updates the read data, wherein the data writing part writes the updated data to the IC tag, wherein the read data and the updated data include data specifying one or more attributes of a character in the game;

a corruption determination part that determines, based upon at least first data read from the IC tag by the data reading part, whether the first data stored in the IC tag is corrupted; and a data rewriting part that writes second data stored in the storage part in association with identification information of the IC tag to the IC tag when the corruption determination part determines that the first data stored in the IC tag is corrupted, wherein the first data and the second data include data specifying said one or more attributes of said character.

12. The information processing apparatus according to claim 1, wherein the storage part writes the data in a table storing respective data elements for each of a plurality of IC tags, wherein the written data includes updates from processing of the game performed in the information processing apparatus, and wherein each respective data element in the table is associated with identification information of a respective IC tag.

* * * * *